United States Patent
Okazaki

(10) Patent No.: US 6,169,785 B1
(45) Date of Patent: Jan. 2, 2001

(54) APPARATUS AND METHOD FOR TESTING SUBSCRIBER LINE

(75) Inventor: Kenichi Okazaki, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/361,360

(22) Filed: Jul. 27, 1999

(30) Foreign Application Priority Data

Jul. 31, 1998 (JP) .................................................. 10-216977

(51) Int. Cl.[7] .................................................... H04M 1/24
(52) U.S. Cl. ................................ 379/27; 379/1; 379/22; 379/10; 702/118
(58) Field of Search ................................ 379/1, 5, 6, 10, 379/15, 23, 24, 26, 27, 29, 30, 32; 370/241, 242, 250, 252; 702/108, 117, 118, 120, 123, 182, 183, 185, 188

(56) References Cited

U.S. PATENT DOCUMENTS 5,761,273 * 6/1998 Sanders .................................... 379/22
5,974,363 * 10/1999 Gammel et al. ....................... 702/117

FOREIGN PATENT DOCUMENTS 59-92661   5/1984   (JP) .

* cited by examiner

*Primary Examiner*—Curtis A. Kuntz
*Assistant Examiner*—Binh K. Tieu
(74) *Attorney, Agent, or Firm*—Foley & Lardner

(57) ABSTRACT

There are provided two line monitoring resistors 63a, 63b of high resistance (Rt1, Rt2) branched at nodes 64a, 64b from subscriber line (LN) 3 in line circuit (LC) 4 and connected between each node and earth, and arithmetic operation unit (EP) 60 into which terminal voltages Vt1, Vt2 of line monitoring resistors 63a, 63b are inputted. Arithmetic operation unit 60 monitors Vt1, Vt2 for a predetermined time when subscriber terminal 2 is in on-hook, and hence detects unbalance of DC voltage of both lines and voltage induced on subscriber line 3 to estimate line resistance. When the subscriber terminal is off-hook, line resistance of the line is estimated using a difference between a theoretical value of Vt1, Vt2 when the line is open and silent and a corrected value in a silent state when the sound component is removed.

7 Claims, 3 Drawing Sheets

APPARATUS AND METHOD FOR TESTING SUBSCRIBER LINE

BACKGROUND OF THE INVENTION

1. Field of the Invention

The present invention relates to an apparatus and a method for testing a subscriber line connected between an exchange and a subscriber terminal.

2. Description of the Related Art

One example of such a prior art apparatus for testing a subscriber line will be described.

FIG. 1 illustrates system arrangement of a communication network including a subscriber line to be tested by an apparatus for testing a subscriber line. The communication network system includes a network (NW) 1 in which connection and switching of line are performed through an exchange, various subscriber terminals (TE) 2 such as a telephone set and a data communication terminal, and the like, a subscriber line (LN) 3 connected between the exchange and each subscriber terminal, and a line circuit (LC) 4 having an interface function between the subscriber terminal 2 and the network 1 for supplying communication electric power to the subscriber terminal through the subscriber line 3.

The subscriber line 3 is constructed by pairing forward and backward two wire conductors a, b for each line. A twisted pair line obtained by twisting two wire conductors is typically used. Sometimes, a coaxial cable composed of a central conductor and a coaxial conductor are used. For signals transmitted through the subscriber line 3 both an analog signal such as a sound and an encoded digital signal are used.

The line circuit 4 includes an interface unit (I/F) 41 for interfacing the subscriber line 3 and the network 1, and a power supply circuit (PW) 42 composed of a DC power supply for supplying DC voltage E to the subscriber terminal 2 through the subscriber line 3 and power supply resistors Rp1, Rp2, and a transformer (TR) 43 and a codec (CD) 44 for separating, coding, and decoding a transmission/reception signal between the subscriber line 3 and the interface unit 41.

The subscriber terminal 2 includes not only conventional telephone sets and facsimiles, but also an in-band ringer (IBR) provided between a leased line and PBX, and a terminal apparatus of an integrated service digital network (ISDN) capable of data communication connected with the subscriber line through digital service unit (DSU) of a subscriber line terminal apparatus, and terminal processing for the subscriber line 3 following respective predetermined protocols.

For example, if the subscriber terminal 2 is a telephone set, and in an on-hook state, DC current is interrupted owing to capacitance of a bell circuit, while in an off-hook state the control is changed over to the communication circuit to permit a communication current to flow. When a subscriber intends to communicate, the subscriber first holds up a handset or brings the control into the off-hook state, and once a destination number is dialed, the call is connected with another telephone set through an exchange, which includes a processor CPU, for analogue speech communication between the telephone sets.

In case the terminal apparatuses are IBR, ISDN, by protocol the on-hook/off-hook state is controlled through the terminal apparatuses. In the case of a data terminal, the control becomes off-hook state during communication as in the case of telephone sets, while control becomes on-hook state during non-communication. For communications, codec 44 connected with the exchange through interface 41 converts communication signals.

Construction of the prior art subscriber line testing apparatus includes line lead-in relay (RE) 51, adapter (AP) 52, measuring apparatus (ME) 53, and processor CPU, as illustrated in FIG. 1.

The line lead-in relay 51 branches the subscriber line 3 from the line circuit 4 and leads it in to the measuring apparatus 53. The adapter 52 connects the led-in line to the measuring apparatus 53. The measuring apparatus 53 measures line constants such as resistance of the subscriber line 3 to which the subscriber terminal 2 is connected. The processor CPU is connected with the measuring apparatus 53 through the network. The processor CPU is also forms a part of the exchange of the network 1, so that subscriber line testing is achieved by applying the CPU part of the exchange to the measuring apparatus.

When the line is normal, and the subscriber terminal is not in communication, only DC voltage supplied from the power supply circuit exists on the subscriber line but when the subscriber terminal is in communication, voltage on the subscriber line becomes the DC voltage of the power supply circuit onto which sound frequency or encoded high frequency transmission/reception signal voltage is superimposed.

Testing of such a subscriber line 3 is executed as follows. A tester first confirms that the subscriber of the line 3, the object to be tested, is not in communication. Then, the line lead-in relay 51 is actuated to once separate and close the line 3 from the exchange. Then, the line 3 is led into the measuring apparatus 53 through the adapter 52 to measure various line parameters such as AC/DC voltage and resistance. Since the measured result is transmitted to the processor CPU through the network 1 other more indirect line parameters can be calculated with arithmetic operation of the processor CPU.

For an improvement of the testing method that extends a measurement range of a subscriber line the following prior art technique has been proposed.

Japanese Laid-Open Patent Publication No. 59-92661 (issued May 28, 1984), discloses "Subscriber Line Testing Method". Prior art testing methods simply demonstrate the existence of external voltage when external voltage of a specified value or more on a subscriber line exists, but fails to measure the line constants of the subscriber line. The present technique ensures measurement of the line constant of the subscriber line even when external voltage exists. There is provided solving means as illustrated in FIG. 2 wherein a and b conductor lines of a subscriber line are connectable to either a testing apparatus or earth, and monitoring is usually done by a voltage detector circuit to determine whether or not any external voltage above the specified value exists on either line.

When an external voltage above the specified value is detected on either one of the conductor lines of a subscriber line, these voltages are indicated, while when the external voltage on only one conductor line exceeds the specified value, one line is connected with earth and the other line is connected with the testing apparatus, and circuit constants such as line resistance of the line when the external voltage is the specified value or lower are automatically measured and displayed.

The aforementioned prior art method however has the following problem.

First, it is necessary to check whether the subscriber of a line to be tested is in communication. Even after it is confirmed that a subscriber is not in communication, a command input operation to a measuring apparatus for line testing in accordance with the kind of subscriber terminal and labor are required.

A measuring apparatus for performing line testing and exclusive testing apparatus such as an adapter are also required. In addition a line lead-in relay RE, a testing adapter AP, and a measuring apparatus ME must be controlled to achieve line testing.

SUMMARY OF THE INVENTION

To solve the difficulties with the prior art, it is an object of the present invention to provide an apparatus and a method for testing a subscriber line not only when the subscriber line is not in communication but also when in communication and wherein line constants are easily measured at all times irrespective of the kind of a subscriber terminal monitoring whether or not the line is normal.

To achieve the above object, an apparatus for testing a subscriber line according to the present invention includes two high resistance line monitoring resistors inserted between each of the two conductor lines of the subscriber line and earth, and an arithmetic operation unit for calculating a predetermined line constant by receiving terminal voltages of the two resistors.

The arithmetic operation unit includes a memory unit in which are stored the values of the at least power supply voltage, i.e., power supply voltage of a power supply circuit, the resistance of the power supply circuit from the power supply power source to the line circuit and the terminal voltage inputted from the terminals of the two line monitoring resistors.

The arithmetic operation unit can calculate line resistance of the subscriber line using the power supply voltage, the power supply resistance, and the terminal voltage of the line monitoring resistor.

Further, when the terminal is in the off-hook state, the line resistance of the subscriber line is removed and the operation put into the silent state by using the difference between the terminal voltage (theoretical value) of the line monitoring resistor when the line is open and in a silent state and a correction value when a sound component in communication from the terminal voltage of the line monitoring resistor actually measured in an off-hook state.

The present invention ensures that even when a subscriber line, the object to be tested, is in communication, normality of the subscriber line can be checked at all times by measuring the line parameters.

Further, measurement of the line parameters can be executed to check the normality of the subscriber line without closing the line or separating the line to connect the line to a measuring unit irrespective of the kind of the subscriber terminal.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENTS

Preferred embodiments of the present invention will be described in detail with reference to the accompanying drawings.

Figure 1:
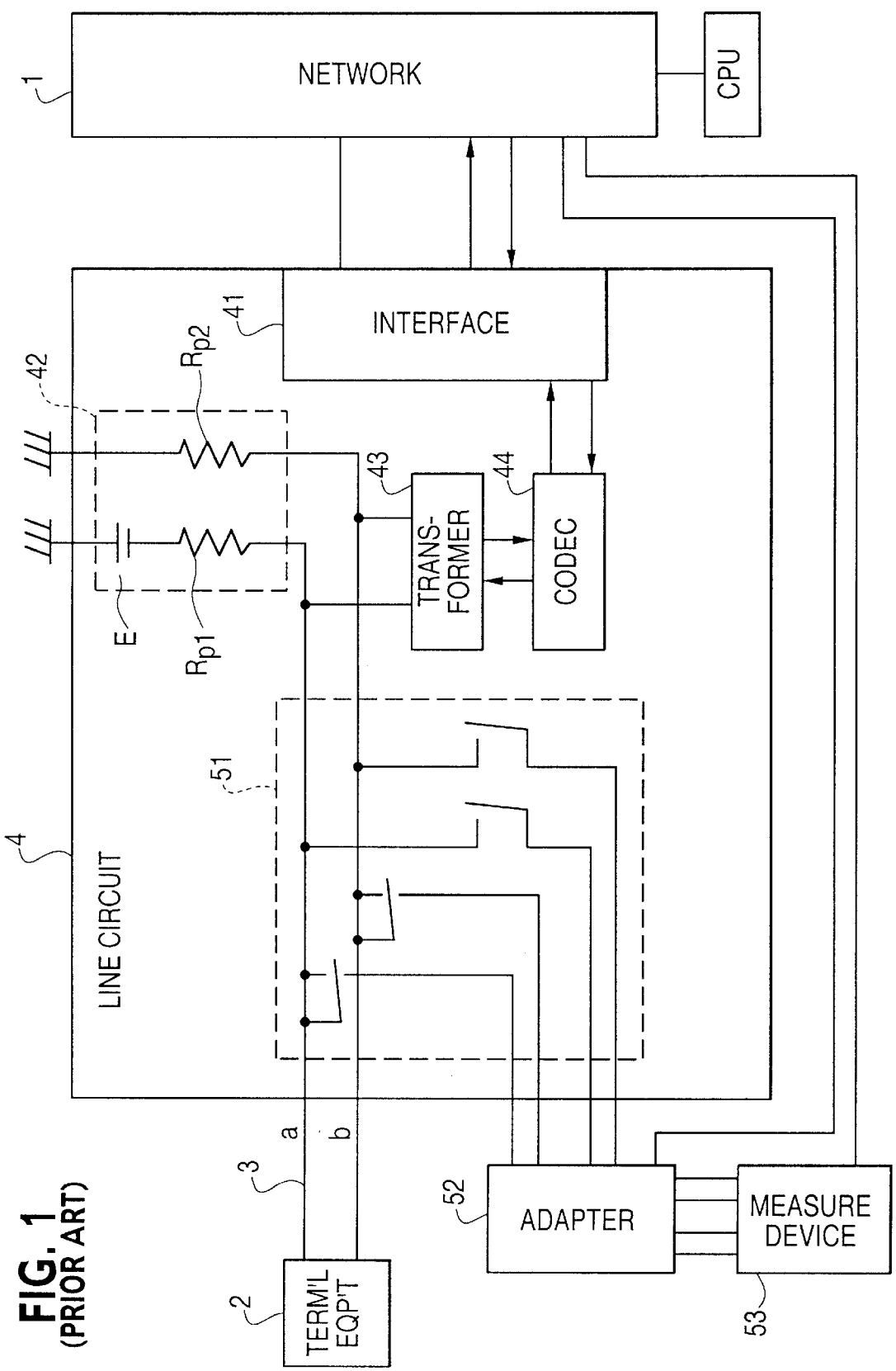
FIG. 1 is a block diagram illustrating an embodiment of a prior art subscriber line testing apparatus.
Figure 2:
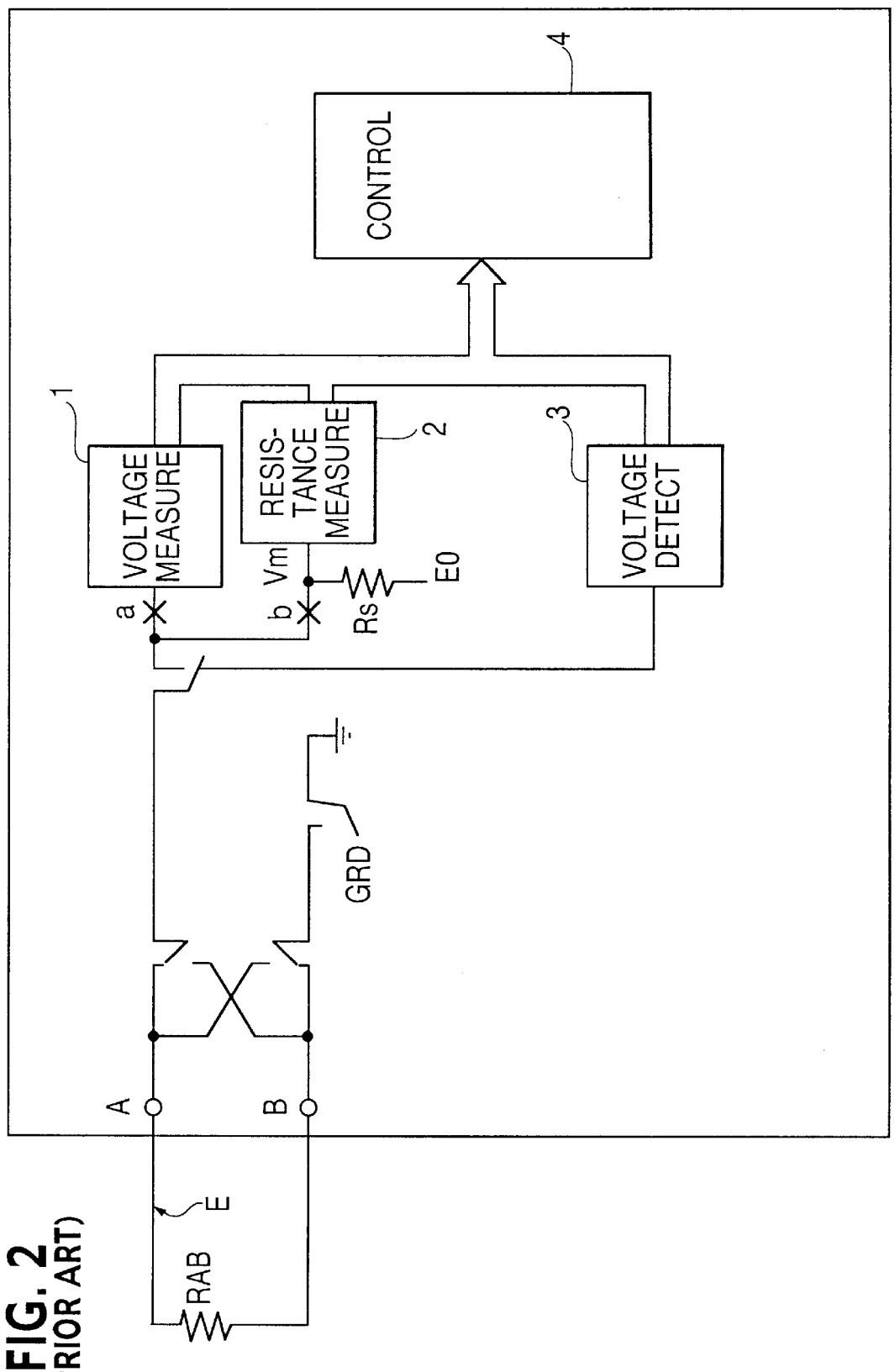
FIG. 2 is a block diagram illustrating another prior art example.
Figure 3:
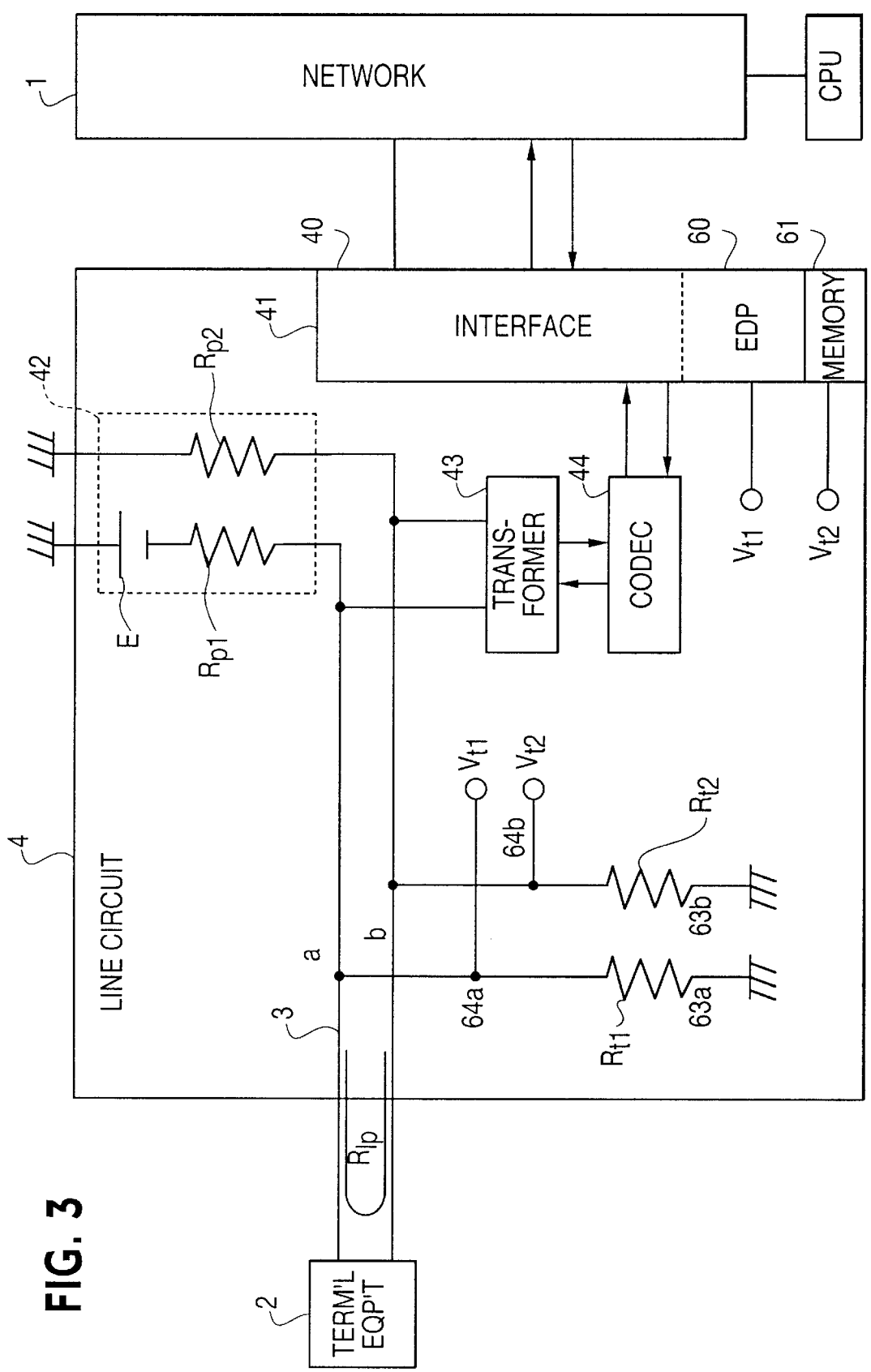
FIG. 3 is a block diagram illustrating a preferred embodiment of the present invention.

Referring to FIG. 3, a subscriber line testing apparatus of the present embodiment includes two high resistance line monitoring resistors (Rt1) 63a, (Rt2) 63b each of which has one end connected to the earth and the other end connected with either wire a of b of subscriber line 3 in line circuit 4, and arithmetic operation part (EP) 60 which conducts predetermined arithmetic operation on the basis of paired earth potentials Vt1, Vt2 inputted from nodes 64a, 64b between the line monitoring resistors and subscriber line 3. Two line monitoring resistors 63a, 63b are assumed to have resistance of about 1 MΩ.

Arithmetic operation part 60 includes memory 61 in which there are stored at least the values of power supply voltage, i.e., DC voltage E of the power supply circuit, resistors Rp1, Rp2 of the power supply circuit from power supply circuit 42 to subscriber line 3 of line circuit 4, and earth potentials Vt1, Vt2 at the node between the two line monitoring resistors into which potentials are inputted arbitrarily.

Earth potentials Vt1, Vt2 at nodes 64a, 64b can be observed even when the line is being used, so that voltage supplied from line circuit 4 to subscriber terminal 2 can be monitored at all times.

Since, in the case of an analog line, power is typically supplied from the DC power supply E=48 V through power supply resistors Rp1, Rp2 of the power supply circuit, when the terminal is on-hook and is hence in a non-communication state, Vt1, Vt2 become predetermined DC voltages of about −24 V and +24 V or less around the earth potential GND=0. Accordingly, if predetermined DC voltage is observed, the circuit may be recognized to be normal. When the terminal is off-hook and is hence in a communication state, AC voltage from a sound or a data signal is superposed on these DC voltages.

Accordingly, detection of line failure such as unbalance of induction voltage from the outside and DC voltage between both lines, and check of normality of power supply voltage from line circuit 4 to subscriber line 3, i.e., line voltage are assured. In addition to detection and check measurement for unbalance of resistance and electrostatic capacity between lines a, b and the earth is assured.

Line resistance Rlp when subscriber line 3 is looped can be calculated with the following formula by arithmetic operation unit 60.

(line resistance: Rlp)=(power supply resistance: Rp1+Rp2)× (line voltage: Vt1+Vt2)/(power supply voltage: E)

When the line is normal line resistance Rlp becomes high resistance indicative of a state between open and insulation, but when the line is abnormal, it becomes low resistance indicative of a short-circuit state.

When the operation is in off-hook for the subscriber to communicate, values of Vt1, Vt2 are also observed at times of a silent state during communication, and a PCM code in line circuit 4 and its PAD value are estimated for both transmission/reception sides and sent to arithmetic operation unit 60 where a sound component is removed from Vt1, Vt2 to calculate corrected voltages V′t1, V′t2 in a silent state.

Then, theoretical values Vt1, Vt2, when the operation is on-hook and the line is open and in a silent state, and corrected voltages V't1, V't2 are compared to calculate the line resistance with the next formula.

(line resistance: Rlp)=(power supply resistance: Rp1+Rp2)×(corrected line voltage: (Vt1+Vt2)−(V't1+V't2))/(power supply voltage: E)

Line resistance Rlp is a resistance peculiar to each loop circuit constituted by conductor lines a, b of the subscriber line and terminal 2 when the line is normal, but when the loop circuit is in failure, i.e., disconnected or short-circuited, resistance Rlp is an insulated state or a short-circuited state which sharply deviated from the peculiar value.

It is here noted that detection of line failure such as presence of biasing of AC voltage components at commercial frequencies 50, 60 Hz and unbalance of DC voltage applied to the subscriber line, and check of normality of the supply voltage to line circuit LC are assured by estimating corrected voltages V't1, V't2.

In the present invention, the necessities of changing over the apparatus to the measuring apparatus for testing and of applying testing voltage and current to the subscriber line is removed, so that testing and measurement of the subscriber line are ensured at all times irrespective of the state of the use of the subscriber line without intervening in the communication of the subscriber line.

Further, the present invention is applicable not only to a prior art typical analog line but also to an ISDN line and an IBR line to which an idle signal and an IBR (In-Band Ringer) line are applied upon non-communication.

In an ISDN line, line testing measurement is ensured during non-communication and communication when the idle signal is being sent.

In the IBR line, mistaken operation is prevented at a terminal due to application voltage for measurement as in the prior art, so that line testing measurement is ensured at all times as described above irrespective of the state of the use of the line during the course of transmission of the idle signal (IBR).

It is to be understood that variations and modifications of an apparatus and a method for testing a subscriber line disclosed herein will be evident to those skilled in the art. It is intended that all such modifications and variations be included within the scope of the appended claims.

What is claimed is:

1. An apparatus for testing a subscriber line by measuring line constants of said subscriber line composed of a pair conductors connected through a line circuit between a network and each of a plurality of subscriber terminals, said network comprising a telephone exchange, each of said subscriber terminal including a telephone set and a data terminal, said line circuit having the function of interface between each of said subscriber terminals and said network and supplying DC electric power from a power supply circuit to each of the subscriber terminals through each said subscriber line; said apparatus comprising two line monitoring resistors with high resistance wherein the opposite ends of each of said resistors are connected to one of the conductor of said subscriber line and the earth respectively; and an arithmetic operation unit for executing predetermined arithmetic operation to calculate the line constants of said subscriber line according to the two earth potentials received from the connection points of said subscriber line and said line monitoring resistors and a predetermined reference value.

2. An apparatus for testing a subscriber line according to claim 1, wherein said arithmetic operation unit includes a memory unit in which are stored values such as DC voltage of said power supply circuit, power supply resistance of said power supply circuit, and the potential value to the earth at the two connection points of the line monitoring resistors to the subscriber line.

3. An apparatus for testing a subscriber line according to claim 1, wherein the values of supply power voltage to the subscriber line, power supply resistance, the terminal voltages of said connection points are inputted into said arithmetic operation unit while said subscriber terminal is in off-hook state and in communication, and the loop resistance of said subscriber line calculated based on the difference between a theoretical value and an actually measured and a corrected value of the terminal voltages.

4. An apparatus for testing a subscriber line according to claim 1, wherein said subscriber line is an Integrated Services Digital Network (ISDN) line.

5. An apparatus for testing a subscriber line according to claim 1, wherein said subscriber line is an In-Band Ringer (IBR).

6. A method for testing a subscriber line by measuring line constants of said subscriber line composed of a pair conductors, said subscriber line being connected through a line circuit between a network and each of a plurality of subscriber terminals, said network comprising a telephone exchange, each of said subscriber terminals including a telephone set and a data terminal, said line circuit having the function of interface between each of said subscriber terminals and said network and supplying DC electric power from a power supply circuit to each of the subscriber terminals through each said subscriber line; said method comprising the steps of:

connecting two resistors having predetermined resistance between the earth and the subscriber line at said line circuit, with one resistor connected to one conductor of the subscriber line and the other resistor to the other conductor;

observing and measuring electric potential to the earth at each connecting point of the resistors and said subscriber line at all times; and calculating line constants of said subscriber line using the measured value of the potential with respect to earth, output voltage of said power supply circuit, and resistance from said power supply circuit to said line circuit.

7. A method of testing a subscriber line according to claim 6 wherein said measurement of electric potential on each conductor of said subscriber line with respect to earth when the subscriber terminal is in the on-hook state and in the off-hook state is done beforehand, both measured values are stored as normal values, and an observed and measured value during the operation of said subscriber line in response to the state of the use of the line is compared with said normal values to determine the state of the line.

* * * * *